United States Patent
Frouin et al.

[11] Patent Number: 5,910,215
[45] Date of Patent: Jun. 8, 1999

[54] SELF-LEVELING FLUID MORTAR INCLUDING CALCIUM SULFATE AND LIME

[75] Inventors: Laurent Frouin, L'Hay-les-Roses; Mustapha Sari, Villeurbanne, both of France

[73] Assignee: Rhone-Poulenc Chimie, Courbevoie, France

[21] Appl. No.: 08/860,137

[22] PCT Filed: Dec. 29, 1995

[86] PCT No.: PCT/FR95/01758

§ 371 Date: Jun. 27, 1997

§ 102(e) Date: Jun. 27, 1997

[87] PCT Pub. No.: WO96/20901

PCT Pub. Date: Jul. 11, 1996

[30] Foreign Application Priority Data

Dec. 30, 1994 [FR] France .................... 94 16038

[51] Int. Cl.$^6$ ............................ C04B 11/06
[52] U.S. Cl. .................... 106/772; 106/773; 106/775; 106/788
[58] Field of Search .................. 106/788, 772, 106/775, 773

[56] References Cited

U.S. PATENT DOCUMENTS

| 4,188,231 | 2/1980 | Valore . | |
|---|---|---|---|
| 5,366,550 | 11/1994 | Schad | 106/730 |
| 5,424,099 | 6/1995 | Stewart et al. | 106/695 |
| 5,556,458 | 9/1996 | Brook et al. | 106/708 |
| 5,685,903 | 11/1997 | Stav et al. | 106/735 |

FOREIGN PATENT DOCUMENTS

| 02192447 | 7/1990 | Japan . |
|---|---|---|
| 403075254 | 3/1991 | Japan . |
| 405078154 | 3/1993 | Japan . |
| 0615745 | 6/1994 | Japan . |
| 406157115 | 6/1994 | Japan . |

*Primary Examiner*—Paul Marcantoni
*Attorney, Agent, or Firm*—Andrew M. Solomon

[57] ABSTRACT

The invention relates to a self-levelling fluid mortar including calcium sulphate, granulates, lime, water and either a silica and a compound containing alumina or a pozzuolana, and to a screed obtained from said fluid mortar. It also relates to the combined use of lime and either of a silica and of a compound containing alumina or a pozzuolana to increase the mechanical strength and reduce the water sensitivity of a screed.

22 Claims, No Drawings

SELF-LEVELING FLUID MORTAR INCLUDING CALCIUM SULFATE AND LIME

The present invention relates to a self-levelling fluid mortar including calcium sulphate and lime and to compositions which can be employed for the preparation of the said mortar.

It also relates to combined uses, with the aim of influencing certain properties, of lime and either of a silica and of a compound containing alumina or of a pozzuolana in a self-levelling fluid mortar and/or in a screed obtained from a self-levelling fluid mortar.

Finally, it deals with a screed obtained from this self-levelling fluid mortar.

A self-levelling fluid mortar is the name given to a fluid mortar which is generally placed in position by pumping, which makes it possible to obtain, after application to or casting on a horizontal surface, a screed which is free from surface irregularity and perfectly horizontal without any mechanical treatment of the surface (such as especially a smoothing) following the casting of the said mortar.

Such mortars are very widely employed in the field of building, in particular to correct the unevennesses of the level of crude structural slabs or of horizontal surfaces of all kinds, on which finished coatings are subsequently placed, such as an adhesively bonded floor, a floor supported by timber joists, plastic slabs or carpeting.

Since the surface obtained must be strictly planar, a self-levelling fluid mortar is obviously preferable, especially because of its ease of application.

However, fluid mortars for a screed have in particular the disadvantage of being very sensitive to water and of having their mechanical strength markedly decreased when they are immersed in water or merely placed in contact with such an element.

In addition, it is important that the rate of setting of the mortar should be fast; on the one hand, in order that the screed may have high mechanical properties at an early age, that is to say within the initial hours following its preparation, which has the effect of reducing the risks of fissuring in the event of mechanical or thermal stresses; on the other hand, it should be rapidly possible to bring the screed into service.

The purpose of the invention is especially to propose self-levelling fluid mortars which do not exhibit the above-mentioned disadvantage.

To this end, it has surprisingly been found by the Applicant Company that the combined use of lime and either of a silica and of a compound containing alumina, or of a pozzuolana, in a self-levelling fluid mortar additionally including calcium sulphate, granulates and water, makes it possible to reduce considerably the sensitivity to water, that is to say to increase considerably the resistance to water of a screed obtained from the said mortar, while providing it, preferably, with good mechanical strength (in air) in particular a very satisfactory flexural tensile strength (in air).

The screeds obtained exhibit, furthermore, the property of having a setting time which is very fast and adaptable to the methods of application which are employed.

Thus, one of the subject-matters of the invention consists of a self-levelling fluid mortar including calcium sulphate, granulates, lime, water and either at least one silica and at least one compound containing alumina or at least one amorphous pozzolan exhibiting surface defects, the weight content of the combination of silica + compound containing alumina or pozzuolana, relative to the weight of calcium sulphate, being between 2 and 10%, preferably between 3 and 7%.

Another subject-matter of the invention lies in the compositions which can be employed for the preparation of a self-levelling fluid mortar including calcium sulphate, granulates, lime, water, optionally granulates and either at least one silica and at least one compound containing alumina or at least one amorphous pozzolan exhibiting surface defects, the weight content of the combination of silica + compound containing alumina or pozzolan, relative to the weight of calcium sulphate, being between 2 and 10%, preferably between 3 and 7%.

The invention also consists of the use of both lime and either of at least one silica and of at least one compound containing alumina, or of at least one amorphous pozzolan exhibiting surface defects, for improving the mechanical strength, in particular the flexural tensile strength, and for reducing the water sensitivity of a screed, and of a screed obtained from a self-levelling mortar according to the invention.

Other characteristics, details and advantages of the invention will appear more clearly on reading the description which is to follow.

The invention firstly relates to a self-levelling fluid mortar including calcium sulphate, granulates (or aggregates), lime, water and either at least one silica and at least one compound containing alumina or at least one amorphous pozzolan exhibiting surface defects, the weight content of the combination of silica + compound containing alumina or pozzolan, relative to the weight of calcium sulphate, being between 2 and 10%, preferably between 3 and 7%.

The mortar according to the invention therefore contains calcium sulphate of natural or synthetic origin.

It is thus possible to employ an anhydrous calcium sulphate, in particular anhydrite, (especially anhydrite II) and/or a partially hydrated calcium sulphate, in particular α-hemihydrate (or α-hemihydrate).

It should be noted that when it is of synthetic origin, anhydrite may be in the form of fluoro- phosphor-, sulpho- or titano-anhydrite.

The fluid mortar according to the invention generally includes between 2 and 10%, preferably between 3 and 7%, by weight of lime (for example of slaked lime $Ca(OH)_2$) relative to the weight of calcium sulphate.

It also includes at least one amorphous pozzolan exhibiting surface defects or, at the same time at least one silica and at least one compound containing alumina.

Pozzolan (or pozzolanic material) is here intended to mean a siliceous or aluminous material which has no bonding property in itself but which, in certain states of crystallinity and of structure, can react in the presence of lime and water to give a cement. The mortar according to the invention includes at least one amorphous pozzuolana exhibiting surface defects and/or a high specific surface. These are pozzolan whose surface contains inclusions, asperities, an uneven relief, in contrast to the pozzolan without any surface defect which are obtained, for example, by quenching, such as blast furnace slags, crystalline volcanic ash etc. The surface defects and the specific surface can be characterized, respectively, by scanning electron microscopy and by measurements of BET surface. BET surface is intended to mean the specific surface as determined by nitrogen adsorption in accordance with ASTM standard D 3663-78, established by starting with the Brunauer-Emmett-Teller method described in the periodical "Journal of the American Chemical Society", 60, 309 (1938). The specific surface of the pozzuolanas employed for the preparation of the mortars according to the invention may be, for example, between 5 and 20 m²/g. The surface defects may be due to an effect which is mechanical (for example grinding), thermal (calcining at a certain temperature) or physicochemical (pinpoint changes in the constituent grains of the pozzolan by a chemical compound).

Examples of useable pozzolan which may be mentioned are meta-kaolin, calcined clays, vegetable fly ash (for example rice husk ash), calcined sludges (especially the red mud from the manufacturer of aluminium, sludge from paper manufacture) and amorphous volcanic ash. In the present invention meta-kaolin is preferably employed as pozzuolana.

A very fine silica is generally used as silica.

A precipitated silica or pyrogenic silica can thus be employed.

The alumina present in the compound employed in combination with the silica must be reactive.

As compound containing alumina it is possible to employ alumina, aluminous or silicoaluminous fly ash, a cement (containing alumina), especially an aluminous cement (for example of the Secar type) or Portland cement, (in particular artificial Portland cement (APC)).

However, in the case where a cement with a high alumina content, for example an aluminous cement, is used as compound containing alumina, this compound must be present in the mortar according to the invention preferably in a weight content of at most 5% relative to the weight of calcium sulphate, especially to avoid an uncontrolled expansion of the screed which will be obtained from the said mortar.

It should be noted that a fluid mortar including both at least one pozzolan at least one silica and at least one compound containing alumina (and the other compounds described in the present specification) remains within the scope of the present invention, even if it does not constitute a very preferred alternative form thereof.

The fluid mortar according to the invention generally has a granulates/calcium sulphate weight ratio of between 1 and 6, preferably between about 1.2 and 2.0.

It preferably contains sand, for example siliceous sand, as granulates.

The quantity of water (cold slaking water) present in the fluid mortar according to the invention is usually between 30 and 60%, for example between 35 and 50%, by weight relative to the weight of calcium sulphate.

The fluid mortar according to the invention may additionally include at least one setting-accelerator.

The quantity of the said setting-accelerator in the said mortar is then generally between 0.5 and 5%, preferably between 1 and 2.5%, by weight relative to the weight of calcium sulphate.

Potassium sulphate may be employed as setting-accelerator.

When the said mortar contains anhydrite as calcium sulphate, it may include, as setting-accelerator, α-hemihydrate, preferably in a quantity of between 0.5 and 5%, preferably between 1 and 2.5% by weight relative to the weight of anhydrite.

The fluid mortar according to the invention may additionally contain at least one plasticizer, generally between 0.1 and 2.0%, in particular between 0.1 and 1.0%, by weight relative to the weight of calcium sulphate.

Plasticizers which may be mentioned by way of example are melamines, polymelamines, polynaphthalenes (especially sodium polynaphthalenesulphonate) polacrylates (especially sodium polyacrylate) and lignosulphonates.

The fluid mortar according to the invention is generally prepared by mixing the products forming part of its constitution (slaking operation); the said products may be introduced into the mixer in any order.

It is possible to mix intimately beforehand, dry, the lime, either the silica and the compound containing alumina or the pozzolan (or, optionally, these three compounds), and the optional setting-accelerator and/or plasticizer, with the calcium sulphate; what is then obtained, and this forms a subject-matter of the invention, is a composition which can be employed (in particular on the work site) for the preparation of a self-levelling fluid mortar, a composition which has the same formulation (or constitution) as the fluid mortar according to the invention and is described above, except that the said composition contains neither water nor granulates; this composition is next introduced into the slaking water; the combination obtained is next mixed, generally at a low speed (for example between 50 and 70 revolutions/minute); finally, the granulates are added gradually and the mixing is continued at high speed (for example between 100 and 140 revolutions/minute).

It is also possible to mix intimately beforehand, dry, the lime, either the silica and the compound containing alumina or the pozzolan (or, optionally, these three compounds), and the optional setting-accelerator and/or plasticizer, with the granulates and the calcium sulphate; what is then obtained, and this forms another subject-matter of the invention, is a composition which can be employed (in particular on the work site) for the preparation of a self-levelling fluid mortar, a composition which has the same formulation (or constitution) as the fluid mortar according to the invention and is described above, except that the said composition does not include water; it then suffices to introduce this composition into the slaking water and to mix the combination obtained in general at high speed.

The combined presence of lime and either of at least one silica and of at least one compound containing alumina or of at least one amorphous pozzuolana exhibiting surface defects, in the mortar according to the invention, makes it possible to increase, (in air) the mechanical strength, in particular above all the flexural tensile strength, of the screed obtained from the said mortar.

This mortar thus exhibits a flexural tensile strength/simple crushing strength ratio which is fairly high (for example at least 30%) and preferably higher than that of the conventional screeds (a ratio of the order of 15 to 20% in general), which is favourable especially in the case of structures which are essentially subjected to loadings giving rise to stresses of the flexural tensile type.

The flexural tensile strength of a test piece generally corresponds to the load needed to break a test piece placed on a 3-point head.

The simple crushing strength of a test piece usually corresponds to the pressure needed to burst a test piece which is compressed between two jaws.

The mortar according to the invention also has the advantage of resulting in shorter setting times, and this makes it possible to obtain mechanical properties which are clearly improved in relation to the mortars of the prior art.

The invention thus also relates to the joint use, in order to increase the mechanical strength, in particular the flexural tensile strength, of lime and either of at least one silica and of at least one compound containing alumina or at least one amorphous pozzuolana exhibiting surface defects, in a screed obtained from a self-levelling fluid mortar additionally including calcium sulphate, granulates and water, the weight content of the combination of silica + compound containing alumina or pozzuolana relative to the weight of calcium sulphate being between 2 and 10%, preferably between 3 and 7%.

In addition, and this is most remarkable, the joint presence of lime and either of at least one silica and of at least one compound containing alumina, or of at least one pozzuolana, in the mortar according to the invention makes it possible to reduce markedly the water-sensitivity (that is to say to increase appreciably the behaviour in water) of the screed obtained from the said mortar.

Thus, after immersion in water (or simply being placed in contact with such a component), this screed retains a completely suitable mechanical strength. In particular, after immersion in water:

on the one hand, it loses only a little of its flexural tensile strength in comparison with that obtained after storage in air (for example in the case of cycles of immersion (5 days)/drying (1 day at 50° C.) it can lose (in relation to its flexural tensile strength after storage in air) only in the region of 10% after a period of 28 days), in contrast to traditional screeds (in the case of which generally the loss (in relation to their flexural tensile strength after storage in air) is then approximately 40% or more after a period of 28 days);

on the other hand, it gains appreciably in simple crushing strength, in comparison with that obtained after storage in air (for example in the case of cycles of immersion (5 days)/drying (1 day at 50° C.), a possible gain (in comparison with its simple crushing strength after storage in air) of at least 20% after a period of 28 days), in contrast to traditional screeds, in the case of which there is a loss in simple crushing strength in comparison with that obtained after storage in air (for example a loss in general of more than 10% after a period of 28 days).

The invention thus also relates to the joint use, in order to reduce the water-sensitivity, of lime and either of at least one silica and of at least one compound containing alumina or of at least one amorphous pozzuolana exhibiting surface defects, in a screed obtained from a self-levelling fluid mortar additionally including calcium sulphate, granulates and water, the weight content of the combination of silica + compound containing alumina or pozzolan in relation to the weight of calcium sulphate being between 2 and 10%, preferably between 3 and 7%.

In all these uses the fluid mortar is as defined above.

The screed obtained from the fluid mortar according to the invention, especially by casting the latter onto a horizontal surface, constitutes another subject-matter of the invention.

EXAMPLE

A fluid mortar according to the invention (mortar 1) is prepared, including, per 100 parts by weight of anhydrous calcium sulphate $CaSO_4$ II (Avonmouth fluoroanhydrite marketed by Rhône-Poulenc Chemicals):

5 parts of Portland cement (compound containing alumina)
2.5 parts of lime $Ca(OH)_2$
2.5 parts of pyrogenic silica
150 parts of Leucate sand
37 parts of water.

A fluid mortar (mortar 2) is prepared, including, per 100 parts by weight of anhydrous calcium sulphate $CaSO_4$ II (Avonmouth fluoroanhydrite marketed by Rhône-Poulenc Chemicals):

5 parts of amorphous blast furnace slag marketed by the company "Ciments Francais"
2.5 parts of lime $Ca(OH)_2$
2.5 parts of pyrogenic silica
150 parts of Leucate sand
37 parts of water.

These mortars are obtained by thorough mixing in a Hobart-type mixer, the total mixing period being 3 to 5 min.

Monitoring of the Setting Kinetics of Fluid Mortars

Monitoring of the setting kinetics was performed with the Vicat needle, at a temperature of 20° C. and a moisture content of 60% relative humidity.

It is found that the beginning of setting of mortar 1 according to the invention with the Vicat needle takes place after 4 h 50 min and the end of setting after 6 h 45 min, that is a curing time of about 2 h.

In the case of the mortar 2, the beginning of setting is recorded at the end of 7 h 25 min, the end of setting being reached after 11 h 15 min, that is a curing time of about 4 h.

The setting periods are therefore clearly longer in the case of the formulation based on blast furnace slags, and this makes the mortar sensitive to the risk of cracking if the strength is not sufficiently high at an early age. Furthermore, the systematic appearance of whitish efflorescence is observed on components produced from the formulation based on blast furnace slags, and this will necessarily require brushing of the screed in the event of a surfacing being laid and at least dust removal if the screed is to remain bare.

Mechanical Performance at an Early Age

Standardized $4 \times 4 \times 16$ cm$^3$ test pieces are produced from mortars 1 and 2 in series of three. The demoulding is performed either at 16 h or at 20 or 24 h, the storage having taken place at 20° C. and at 60% relative humidity.

The simple crushing strength of a test piece is measured, which corresponds to the pressure necessary to burst a test piece which is compressed between two jaws (=breaking stress).

The measurements are listed together in Table 1.

During the first 20 hours mortar 1 according to the invention systematically exhibits a simple crushing strength which is higher than that of mortar 2. This characteristic gives mortar 1 a lower probability of fissuring in the event of shrinkage produced by the surrounding conditions (temperature, moisture content, air currents, exposure to sunlight, etc.).

TABLE 1

|  | Mortar 1 | Mortar 2 |
| --- | --- | --- |
| Breaking stress (MPa) at 16 h | 5.2 | 3.4 |
| Breaking stress (MPa) at 20 h | 7.7 | 5.8 |
| Breaking stress (MPa) at 24 h | 17.8 | 17.8 |

What is claimed is:

1. A self-leveling fluid mortar comprising anhydrite calcium sulfate or α-hemihydrate calcium sulfate, aggregates, lime, water and either: (1) one or more precipitated silicas or pyrogenic silicas and one or more compounds containing reactive alumina; or (2) one or more amorphous pozzolans having a BET surface area between 5 and 20 g/m$^2$ and selected from the group consisting of meta-kaolin, calcined clay, vegetable ash, and amorphous volcanic ash, the weight content of either component (1) or component (2), relative to the weight of calcium sulfate, being between 2 and 10%.

2. A fluid mortar according to claim 1, wherein the weight content of either component (1) or component (2), relative to the weight of calcium sulfate is between 3 and 7%.

3. A fluid mortar according to claim 1, having between 2 and 10% by weight of lime relative to the weight of calcium sulfate.

4. A fluid mortar according to claim 3, having between 3 and 7% by weight of lime relative to the weight of calcium sulfate.

5. A fluid mortar according to claim 1, comprising one or more compounds containing alumina and one or more silicas.

6. A fluid mortar according to claim 1, wherein said pozzolan is a red mud from the manufacture of aluminum or a paper making sludge.

7. A fluid mortar according to claim 1, having between 30 and 60%, by weight of water relative to the weight of calcium sulfate.

8. A fluid mortar according to claims 7, having 35 and 50% of water relative to the weight of calcium sulfate.

9. A fluid mortar according to claim 1, having a aggregates/calcium sulfate weight ratio of between 1 and 6.

10. A fluid mortar according to claim 9, having a aggregates/calcium sulfate weight ratio of between 1.2 and 2.0.

11. A fluid mortar according to claim 1, comprising sand as aggregates.

12. A fluid mortar according to claim 1, comprising, as calcium sulfate, anhydrous calcium sulfate or partially hydrated calcium sulfate.

13. A fluid mortar according to claim 1, further comprising one or more setting-accelerators.

14. A fluid mortar according to claim 13, having between 0.5 and 5% by weight of setting-accelerator relative to the weight of calcium sulfate.

15. A fluid mortar according to claim 14, having between 1 and 2.5% by weight of setting-accelerator relative to the weight of calcium sulfate.

16. A fluid mortar according to claim 14, wherein the calcium sulfate is anhydrite calcium sulfate and the setting-accelerator is α-hemihydrate.

17. A fluid mortar according to claim 1, further comprising one or more plasticizers.

18. A composition for the preparation of a self-leveling fluid mortar, comprising anhydrite calcium sulfate or α-hemihydrate calcium sulfate, lime, and either: (1) one or more precipitated silicas or pyrogenic silicas and one or more compounds containing reactive alumina; or (2) one or more amorphous pozzolans having a BET surface area between 5 and 20 g/m$^2$ and selected from the group consisting of meta-kaolin, calcined clay, vegetable ash, and amorphous volcanic ash, the weight content of either component (1) or component (2), relative to the weight of calcium sulphate being between 2 and 10%.

19. A composition for the preparation of a self-levelling fluid mortar, comprising anhydrite calcium sulfate or α-hemihydrate calcium sulfate, lime, aggregates, and either: (1) one or more precipitated silicas or pyrogenic silicas and one or more compounds containing reactive alumina; or (2) one or more amorphous pozzolans having a BET surface area between 5 and 20 g/m$^2$ and selected from the group consisting of meta-kaolin, calcined clay, vegetable ash, and amorphous volcanic ash, the weight content of either component (1) or component (2), relative to the weight of calcium sulphate being between 2 and 10%.

20. A process for the preparation of a mortar with increased mechanical strength, comprising the steps of mixing at the same time lime and either: (1) one or more precipitated silicas or pyrogenic silicas and one or more compounds containing reactive alumina; or (2) one or more amorphous pozzolans having a BET surface area between 5 and 20 g/m$^2$ and selected from the group consisting of meta-kaolin, calcined clay, vegetable ash, and amorphous volcanic ash, the weight content of either component (1) or component (2), relative to the weight of calcium sulphate being between 2 and 10%.

21. A process for the preparation of a mortar with reduced water sensitivity, comprising the steps of mixing at the same time lime and either: (1) one or more precipitated silicas or pyrogenic silicas and one or more compounds containing reactive alumina; or (2) one or more amorphous pozzolans having a BET surface area between 5 and 20 g/m$^2$ and selected from the group consisting of meta-kaolin, calcined clay, vegetable ash, and amorphous volcanic ash, the weight content of either component (1) or component (2), relative to the weight of calcium sulphate being between 2 and 10%.

22. A fluid mortar according to claim 1, wherein said compound containing reactive alumina is an aluminous cement whose weight, relative to the weight of calcium sulfate, is at most 5%.

* * * * *